United States Patent [19]

Vastag

[11] 4,106,414

[45] Aug. 15, 1978

[54] SEED PLANTER AND PLANTING VALVE THEREFOR

[76] Inventor: Carl Vastag, 34 Pope Blvd., Prairie View, Ill. 60090

[21] Appl. No.: 724,866

[22] Filed: Sep. 20, 1976

[51] Int. Cl.² .......................... A01C 7/04; A01C 5/06
[52] U.S. Cl. ......................................... 111/1; 53/247;
111/34; 221/211; 294/65
[58] Field of Search ................... 47/1; 111/1, 77, 34;
221/211; 141/270, 233; 294/65; 53/237, 240,
247; 214/8.5 D

[56] References Cited

U.S. PATENT DOCUMENTS

| 773,205 | 10/1904 | Green ................................. 221/211 |
| 792,958 | 6/1905 | Bagger ............................... 221/211 |
| 1,762,671 | 6/1930 | Slathar ............................... 221/211 |
| 1,915,541 | 6/1933 | Lenz ................................ 221/211 X |
| 2,341,795 | 2/1944 | Kriegbaum et al. .............. 111/87 X |
| 2,546,838 | 3/1951 | Tasche ................................. 111/1 |
| 2,662,679 | 12/1953 | Sonnenberg ..................... 221/211 X |
| 2,903,290 | 9/1959 | Morris et al. ......................... 294/65 |
| 3,085,713 | 4/1963 | Reiners ........................... 221/211 X |
| 3,240,175 | 3/1966 | Clow ................................. 111/77 |
| 3,368,324 | 2/1968 | Leedy ................................. 53/247 |
| 3,453,802 | 7/1969 | Riddington ...................... 53/247 X |
| 3,571,971 | 3/1971 | Broersma ............................... 47/1 |
| 3,738,530 | 6/1973 | Fine et al. ......................... 111/1 X |
| 3,750,832 | 8/1973 | Ovarnstrom ...................... 111/1 X |
| 3,903,643 | 9/1975 | Blackmore et al. .................. 47/87 |
| 3,920,128 | 11/1975 | Baker ............................... 294/65 X |

FOREIGN PATENT DOCUMENTS 150,788 4/1953 Australia ................................. 221/211
1,915,602 10/1970 Fed. Rep. of Germany .......... 221/211

Primary Examiner—Edgar S. Burr
Assistant Examiner—Steven A. Bratlie
Attorney, Agent, or Firm—Robert W. Erickson

[57] ABSTRACT

A self-cleaning, non-clogging seed-planting valve which functions in an alternating cycle of applied vacuum and atmospheric pressure. The valve is formed from an elongated housing, having a hollow core, and to the lower end of which a nozzle is attached. The nozzle has an upper internal diameter less than that of the hollow core, and a reduced lower internal diameter which provides a flat valve-seating surface. A center shaft, coaxially-disposed and vertically movable within the hollow core, has a reduced cross section at its lower end which terminates as a cleaning wire capable of extending into and through the nozzle. A flat gasket valve slidably engages the cleaning wire and contacts the valve-seating surface as the center shaft moves downwardly through the hollow core. The seed planter constitutes a box-like vacuum chamber to the lower surface of which a plurality of the seed-planting valves are connected in spaced-apart relationship. Thus constructed, the seed planter is ideally suited for rapidly planting seeds in nursery flats.

10 Claims, 14 Drawing Figures

SEED PLANTER AND PLANTING VALVE THEREFOR

APPLICABILITY OF INVENTION

The present invention is specifically directed toward a self-cleaning, substantially non-clogging seed-planting valve, and encompasses, in particular, a nursery flat seed-planting device which utilizes a plurality of the seed-planting valves as hereinafter described. It is understood that there is no intent to limit the use of the valve to the nursery flat planter specifically illustrated. The valve is readily adaptable for utilization with other types of nursery planters — a rotary model, as shown in the prior art — as well as a variety of so-called "field planters".

When the appropriate prior art (a portion of which is hereinafter specifically delineated) is reviewed, it is readily ascertained and apparent that previous workers in this area were primarily concerned with (1) the number of seeds being planted in a given area, whether manually or mechanically, (2) the necessity for subsequent thinning and/or transplanting from one nursery flat to another prior to planting in a garden, or field, and (3) the time and tedium expended when preparing nursery flats manually. While the valve encompassed by the present invention is capable of planting a single seed in any given location — e.g. relatively large seeds which can be exemplified by cabbage, pepper and/or tomato seeds — it is extremely well-suited for planting from two to about five seeds of the size characteristic of ageratum, portulaca, nicotiana, lobelia, etc. While single-seed planting of larger seeds may have advantages in the field, nursery flats generally require more than one seed per planting location to afford assurance that at least one will successfully germinate to produce the desired plant. The flexibility of the present valve, in this respect, constitutes one of the principal advantages over the prior art; as above stated, and as hereafter more specifically set forth, another benefit is derived from the adaptability of the present seed-planting valve to a wide variety of planting devices.

OBJECTS AND EMBODIMENTS

A principal object of my invention is to provide a self-cleaning, seed-planting valve having an airflow shut-off, or vacuum release integrated therein. A corollary objective resides in a nursery flat seed planter utilizing a multiplicity of such seed-planting valves. It is a further object of the invention herein described to decrease both the time and effort expended in planting seeds.

Specifically, it is an intended object to facilitate the planting of flower and vegetable seeds, in nursery flats or in the field, uniformly, without waste of seeds and without expending an unusual amount of time and effort.

These objects, as well as others which will become readily apparent by those skilled in the appropriate art, are achieved, in one embodiment of the present invention, by a seed-planting valve which comprises, in cooperative combination: (a) an elongated housing having (i) a hollow core and, (ii) a plurality of apertures in the upper end portion thereof, and in open communication with said hollow core; (b) a nozzle removably connected to the lower end portion of said elongated housing, and having (i) an upper internal diameter less than said hollow core and, (ii) a lower internal diameter less than said upper internal diameter providing a valve-seating surface; (c) a coaxially-disposed center shaft vertically-movable within said hollow core, (i) extending through the upper end of said housing and, (ii) being reduced in cross section at its lower end, providing a cleaning wire within said nozzle; (d) a first center shaft travel stop in the upper end portion of said hollow core; (e) an internal housing, having upper and lower ends, containing (i) a second center shaft travel stop and, (ii) a first coil spring; (f) a second coil spring mounted on said center shaft below said first travel stop and having a bottom end which contacts said nozzle; and, (g) a substantially flat gasket valve slidably engaging said cleaning wire, and disposed between the lower end of said internal housing and said valve-seating surface.

More specifically, my inventive concept encompasses a seed-planting valve which comprises, in cooperative combination: (a) an elongated housing having (i) a hollow core and, (ii) a plurality of apertures, communicating with said hollow core, in the upper end portion thereof; (b) a nozzle removably connected to the lower end portion of said elongated housing, and having (i) an upper internal diameter less than said hollow core at the juncture thereof with said housing and, (ii) a lower internal diameter less than said upper internal diameter, providing a substantially flat valve-seating surface; (c) a coaxially-disposed center shaft vertically-movable within said hollow core, and (i) extending upwardly through the upper end of said housing and, (ii) being reduced in cross section at its lower end, at least a distance equal to the length of said nozzle, providing a cleaning wire within said nozzle; (d) a first center shaft travel stop in the upper end portion of said hollow core; (e) an internal housing, having upper and lower ends, disposed proximate to the juncture of said nozzle with said elongated housing, and containing (i) a second center shaft travel stop and, (ii) a first coil spring surrounding the reduced lower end of said center shaft which extends through said internal housing; (f) a second coil spring surrounding said center shaft, disposed between said first travel stop and the upper end of said internal housing, and having a bottom end contacting said nozzle; and, (g) a substantially flat gasket valve slidably engaging said cleaning wire, and disposed between the lower end of said internal housing and said valve-seating surface.

As hereinabove stated, the present invention further encompasses a device for planting seeds in a nursery flat. Therefore, another embodiment is particularly directed toward a vacuum-operated seed planter which comprises, in cooperative combination with a vacuum source: (a) a box-like vacuum chamber (i) having separated upper and lower surfaces and, (ii) communicating with said vacuum source via first conduit means; (b) a center plate disposed between said upper and lower surfaces, and freely vertically-movable within said vacuum chamber; (c) vacuum-operated first motor means (i) communicating with said vacuum source via second conduit means, (ii) connected, through the upper surface of said vacuum chamber, to said center plate and, (iii) adapted to effect vertical movement thereof within said vacuum chamber; (d) a plurality of spaced-apart seed-planting valves connected to the lower surface of said vacuum chamber, said valves (i) having a hollow core housing, a plurality of apertures in the upper end portion thereof, such that said hollow core is in open communication with said vacuum chamber, and a coaxially-disposed center shaft vertically-movable within said hollow core and extending through the upper end of said housing, and, (ii) contacting said center plate, within said vacuum chamber, at the upper extremity of said center shaft; (e) a seed planter frame containing a plurality of spaced-apart seed storage hoppers; (f) guide supporting means, disposed a finite distance below the lower surface of said vacuum chamber, adapted to receive said seed planter frame; (g) vacuum-operated second motor means communicating with said vacuum source via third conduit means; and, (h) vertically-aligned biased hinge means (i) attached to said vacuum chamber and said supporting guide means and, (ii) in hinged connection to said second motor means.

Other objects and embodiments of the seed planter and seed-planting valve therefor, will become readily apparent from the following, more detailed description of the present invention, particularly when read in conjunction with the accompanying drawings. With respect to the valve itself, in one such other embodiment, the lower internal diameter of the nozzle portion is further reduced proximate to the terminus thereof, via a frusto-conical section to provide an internal guide for the cleaning wire. The various motor means employed to effect the operative function of the seed planter preferably take the form of diaphragm vacuum valves.

PRIOR ART

It must be recognized and acknowledged that the prior art is replete with a wide variety of publications, inclusive of issued patents, which are directed toward seed planting and devices designed to accomplish this in a manner which improves what is strictly a manual operation. In the interest of brevity, no attempt will be made herein to exhaustively delineate such seed-planting art. However, several examples thereof will be described in order to illustrate the area in which my invention is intended to be applied. It is believed, and will be clearly ascertained, that none of these examples of relevant prior art, either singly, or in combination, recognize the seed planter and valve constituting the present invention.

U.S. Pat. No. 2,546,838 (Cl. 111-1), issued Mar. 27, 1951, describes and claims a vacuum-operated nursery flat seed planter having a coordinate array of tubes. The tubes communicate with a vacuum header, and terminate in a suction aperture smaller than the seed to be planted and sized to pick up only a single seed. In contrast to the valve and seed planter herein described, it should be noted that the suction aperture of the tubes is always under a vacuum, and that no cleaning wire, integral with the tube itself, is provided. The external valve is employed to control the suction effect, and there is no recognition of a complete vacuum shut-off which exposes the suction apertures to atmospheric pressure.

U.S. Pat. No. 2,704,685 (Cl. 294-65), issued Mar. 26, 1955, describes a perforated vacuum chamber which functions absent any valves, or tubes, and upon which the seeds are distributed by hand. The application of vacuum to the interior of the box causes a single seed to adhere at each of the perforations. The vacuum chamber is then inverted over the seed bed, or flat, and the vacuum relieved by closing a valve in the conduit leading to the vacuum source. Aside from the use of a vacuum/atmospheric pressure cycle, there exists a complete void with respect to the invention herein described.

In U.S. Pat. No. 3,294,045 (Cl. 111-1), issued Dec. 27, 1966, a machine is disclosed for the planting of individual seeds which have been spaced along the length of two rolls of paper to form a seed-containing tape. This is then pretreated with a nutrient solution to insure germination, and the seeds are planted by tearing the seed tape at intervals between seeds. U.S. Pat. No. 3,307,749 (Cl. 222-276), issued Mar. 7, 1967, describes, and is directed toward a totally manually/mechanically operated device utilizing a perforated slidable tray. Quite clearly, these two illustrations have no applicability whatsoever to my inventive concept.

U.S. Pat. No. 3,637,108 (Cl. 221-221), issued Jan. 25, 1972, directs itself to a seed dispenser for use in conjunction with a field planter. The dispenser employs internal drum pressure to hold seeds against the perforations therein; the seeds are subsequently released into planting tubes through which they are discharged into the soil by air under pressure. This patent is specifically mentioned in U.S. Pat. No. 3,881,631 (Cl. 221-6), issued May 6, 1975, which is directed to a rotating drum planter/dispenser in combination with a monitoring device which senses the flow of air from the peripheral drum openings and from the seed discharge tubes. Vacuum indicators are employed to determine (1) whether the discharge tubes are functioning or obstructed, (2) whether the seed supply is depleted and, (3) whether the drum is rotating.

U.S. Pat. No. 3,750,832 (Cl. 221-211), issued Aug. 7, 1973, involves the use of alternating vacuum and positive (superatmospheric) pressure in a "swing" type seed planter somewhat similar to that described in U.S. Pat. No. 2,546,838, above set forth. The planter utilizes nozzles having one or more small diameter openings, each of which is surrounded by planer surfaces angular thereto. The principal advantage is stated as being the ability to control the number of seeds adhering to each seed lifter. The seed lifters are blown clean via connection to the positive pressure side of a blower, the planting cycle thus being (1) vacuum, (2) atmospheric pressure and, (3) positive pressure. There is no recognition of a seed planting valve which is complete with a cleaning wire, and which functions in a two-stage cycle of applied vacuum and vacuum release to atmospheric pressure.

Another rotating drum seed segregator and planter is disclosed in U.S. Pat. No. 3,240,175 (Cl. 111-77), issued Mar. 15, 1966. Hollow needles are circumferentially disposed on the external surface of the drum along its radial extensions. Two types of hollow needles are described, one of which is provided with a so-called cleaning wire. When utilizing the needle without the cleaning wire, the planting cycle mechanically involves the three steps of suction, atmospheric pressure and superatmospheric pressure which blows the needle clean. In describing the modification which incorporates the cleaning wire, it is repeatedly stated that there is no vacuum release to atmospheric pressure, and no imposition of a positive pressure; that is, suction at the end of the needle is constantly applied. The function of the cleaning wire is to disengage the seed which adheres to the end of the needle as the wire is forced outwardly through the mechanical action of a cam arrangement. Since suction is constantly being applied, there is no effective cleaning action, and dust, broken seeds and seed husks will accumulate to the extent that clogging will ultimately prevent seeds from being collected. Furthermore, since the wire functions only to release the seeds, this modified needle can only be employed to plant the larger seeds. This seed segregator and planter can in fact be improved with respect to its function and results through the incorporation of the seed-planting valve of the present invention.

SUMMARY OF INVENTION

As hereinafter more completely described in conjunction with the accompanying drawings, the seed-planting valve of the present invention is intended to facilitate the planting of all types, shapes and sizes of vegetable and flower seeds. A large variety of the smaller flower seeds (some virtually dust-like) must necessarily be planted two to about five at a time, in order to insure a successful planting at each location, while the much larger vegetable seeds are generally intended to be planted singularly. One principal advantage of my seed-planting valve stems from the fact that it is quite impractical to fabricate nozzles of varying size to accommodate the varying shapes and sizes of seeds. Minor construction modifications to the basic planting valve encompassed by my inventive concept afford enhancement in planting all sizes and shapes of seeds.

Difficulties attendant the necessarily small openings in the nozzle tips and the clogging thereof with dust, husks, etc., are readily overcome by the present seed-planting valve which employs a mechanical cleaning system combined with an internal, automatic vacuum shut-off, or release valve. The various elements which make up the planting valve are contained within an elongated housing having a hollow core. Unless otherwise specifically stated, all of the elements are substantially circular in cross-section. The elongated housing is provided at its upper and lower extremities with threaded portions and, also at its upper extremity, a plurality of apertures intended to communicate openly with a suitable vacuum chamber. Within the hollow core is a coaxially-disposed center shaft which extends through the upper end of the housing and is vertically-movable therein.

The center shaft is enlarged at an upper section to provide a travel stop which inhibits excessive travel thereof outside the confines of the housing. The travel stop also forms an internal annular-form area (with the interior surface of the housing) which communicates with the vacuum chamber by way of the apertures. For the primary purpose of aligning and stabilizing the internal elements of the seed-planting valve, with respect to horizontal movement, the center shaft is further enlarged in cross-section, but irregularly to permit air flow through the thus-narrowed annulus. A first coil spring is situated around a central portion of the center shaft, and is biased against the bottom surface of the stabilizer. This serves to actuate and control the cleaning wire in the manner hereinafter set forth; briefly, however, its principal function is to retract the cleaning wire to its static position.

An internal housing surrounds the center shaft immediately below the central portion thereof, and contains an upper travel stop and a second, smaller coil spring. The internal spring housing and its contents have limited vertical movement with respect to the center shaft, the movement being restricted by a vacuum shut-off valve facing, or seat. The principal function of the second, smaller spring is to actuate a shut-off valve, thereby effecting contact thereof with the valve facing. This essentially brings about a release of the vacuum within the nozzle such that the tip thereof is exposed to atmospheric pressure. The shut-off valve is preferably fabricated from a resilient, or semi-rigid material such as rubber, polyvinyl, Teflon, or other composition which possesses sufficient flexibility to form a substantially air-tight seal with the valve facing. Preferably, the gasket-type valve is not permanently attached to the center shaft; this facilitates replacement thereof as the need arises. The housing and other component parts of the seed-planting valve are held in proper configuration by the provision of a threaded cap. This cap also maintains the nozzle portion of the valve, which protrudes through the lower extremity of the housing, in air-tight contact therewith. The lower extremity of the center shaft is much narrower than the remainder in order to provide the cleaning wire which is utilized to remove dust, dirt, seed hulls, etc. In a preferred embodiment, the end of the cleaning wire terminates in a portion which is non-circular in cross-section. The irregular shape provides very small openings at the tip of the nozzle to which the seeds adhere. Although a triangular shape is most suitable for planting from about three to about five seeds, the shape may be essentially square, oblong, hexagonal, octagonal, pentagonal, etc.

In essence, the operation of the seed-planting valve involves three separate phases. In phase I, the entire housing and the tip of the nozzle are exposed to the vacuum imposed upon the vacuum chamber of the particular planting device, or apparatus. The internal shut-off valve is, of course, in an open position. Air is caused to flow into the tip of the nozzle, and the seeds adhere thereto as a result of the continuing suction. In one application, a vacuum always exists above the shut-off valve, even when in the closed position. Phase II commences when the center shaft is forced in a downwardly direction toward the end of the nozzle. Although the steps of this phase appear to occur virtually simultaneously, during the operation, there is an actual, but very short time delay. As the shaft commences its downward movement, both coil springs begin to assume a state of compression. The larger spring compresses first, but the smaller of the two completes its function first — this to cause the shut-off valve to seat against the valve facing. Since the tip of the nozzle then comes under the influence of the then existing atmospheric pressure, the seeds fall off into the planting soil. At this instant, the terminus of the cleaning wire is substantially even with the openings in the tip of the nozzle. Almost immediately, the larger of the two coil springs becomes compressed to the extent that the cleaning wire proceeds in a downwardly direction to extend a finite distance out of the end of the nozzle. This action removes any dust, soil and/or seed hulls which would otherwise accumulate to clog the very small openings to which the seeds adhere.

Phase III essentially reverses the foregoing; that is, as the center shaft is released, the larger coil spring retracts to the extent that the cleaning wire is once again substantially even with the end of the nozzle. The shut-off valve continues to assume a closed position at this stage of the operation, and remains closed until the smaller coil spring retracts sufficiently to open the same. The valve is then in the proper position to commence another seed-planting cycle.

The further explanation of the present seed-planting valve, as well as its incorporation into combination with a planting device for the preparation of common nursery flats, will be made in conjunction with the several accompanying drawings. It is understood that these are presented for the sole purpose of illustrating the present invention, and not with the intent of unduly limiting the same, the scope and spirit of which is defined by the appended claims.

BRIEF DESCRIPTION OF DRAWINGS

With reference now to the accompanying drawings.

DETAILED DESCRIPTION OF DRAWINGS

Figure 1:
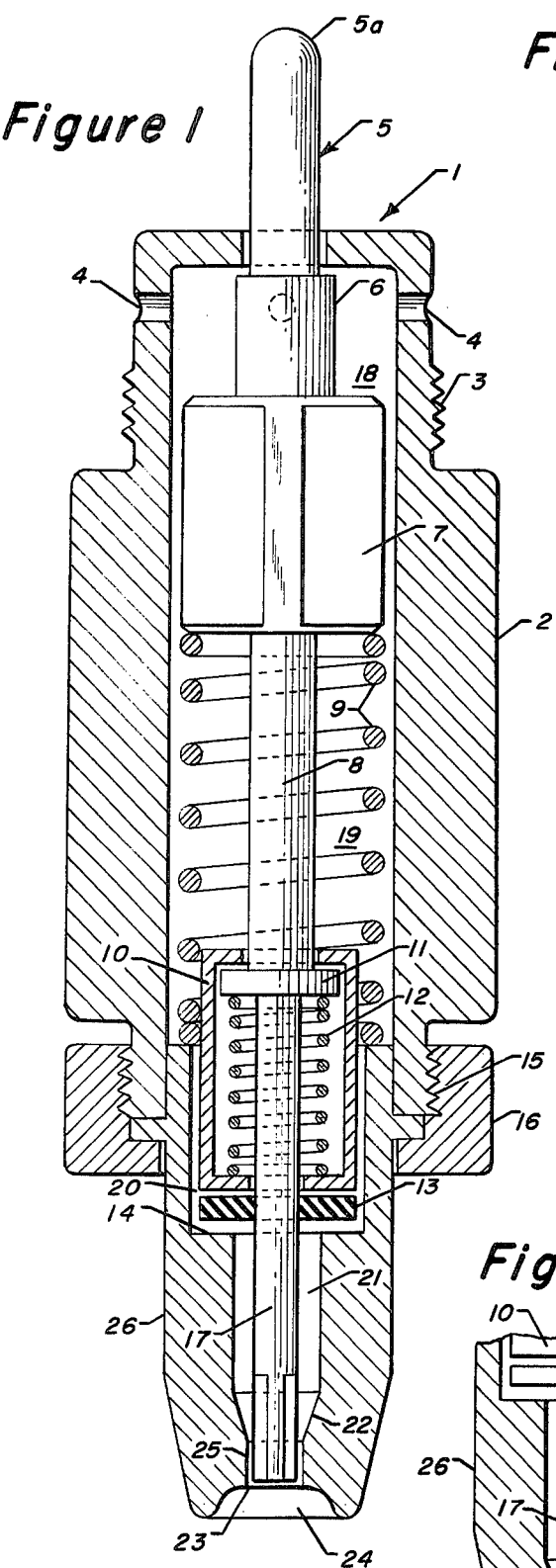
FIG. 1 is a partially-sectioned view of the entire seed-planting valve intended to illustrate its construction and the relationship of the various elements within the hollow core of housing 2.
Figure 11:
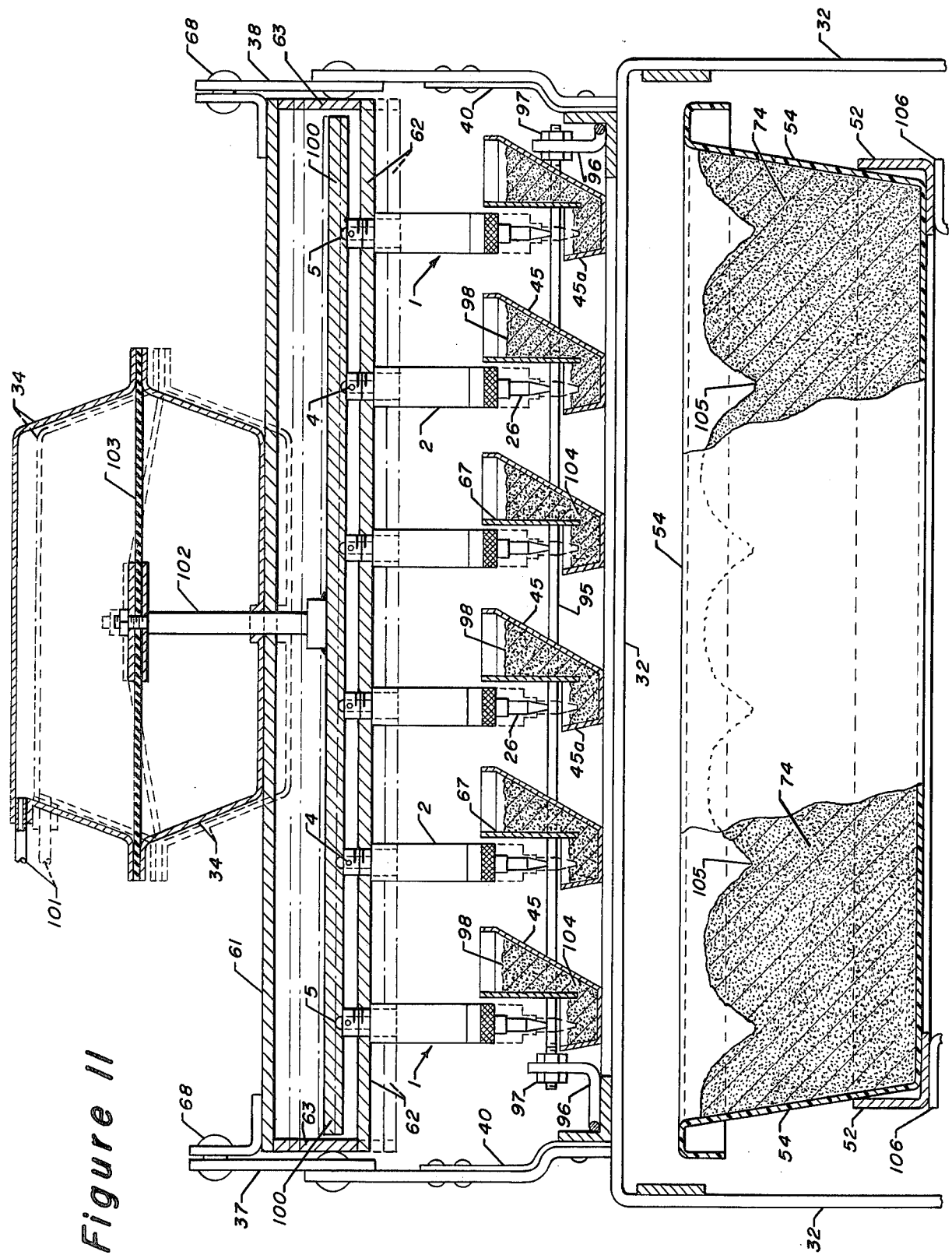
FIG. 11 is a partially-sectioned view taken substantially along the line 11—11 of FIG. 9. The primary purpose of this particular Figure is to show the relationship of vacuum motor 34 and center plate 100, communicating by way of shaft 102 and diaphragm 103. Also indicated is the configuration of seed supply bins 45a with seed storage hoppers 45 having a flow control opening 104.

With specific reference now to FIG. 1, the entire seed-planting valve, generally indicated by the numeral 1, is presented in partial section to illustrate its construction and the inter-relationship of the component parts. Unless otherwise specifically mentioned, all of the various elements are substantially circular in cross section. The various elements which form planting valve 1 are contained within an elongated housing 2 having a hollow core, and being adapted at its upper extremity with a threaded portion 3 and a threaded portion 15 at its lower extremity. Situated above threaded portion 3 is a plurality of apertures 4, generally from about two to about four, which, as hereinafter described with reference to FIG. 11, are in open communication with a vacuum chamber. It should be noted that, in most of the applications, the seed-planting valve of the present invention functions either under a vacuum, or at atmospheric pressure. The hollow core housing 2 has centered therein a main center shaft 5 which extends through the housing to its uppermost extremity 5a.

Figure 9:
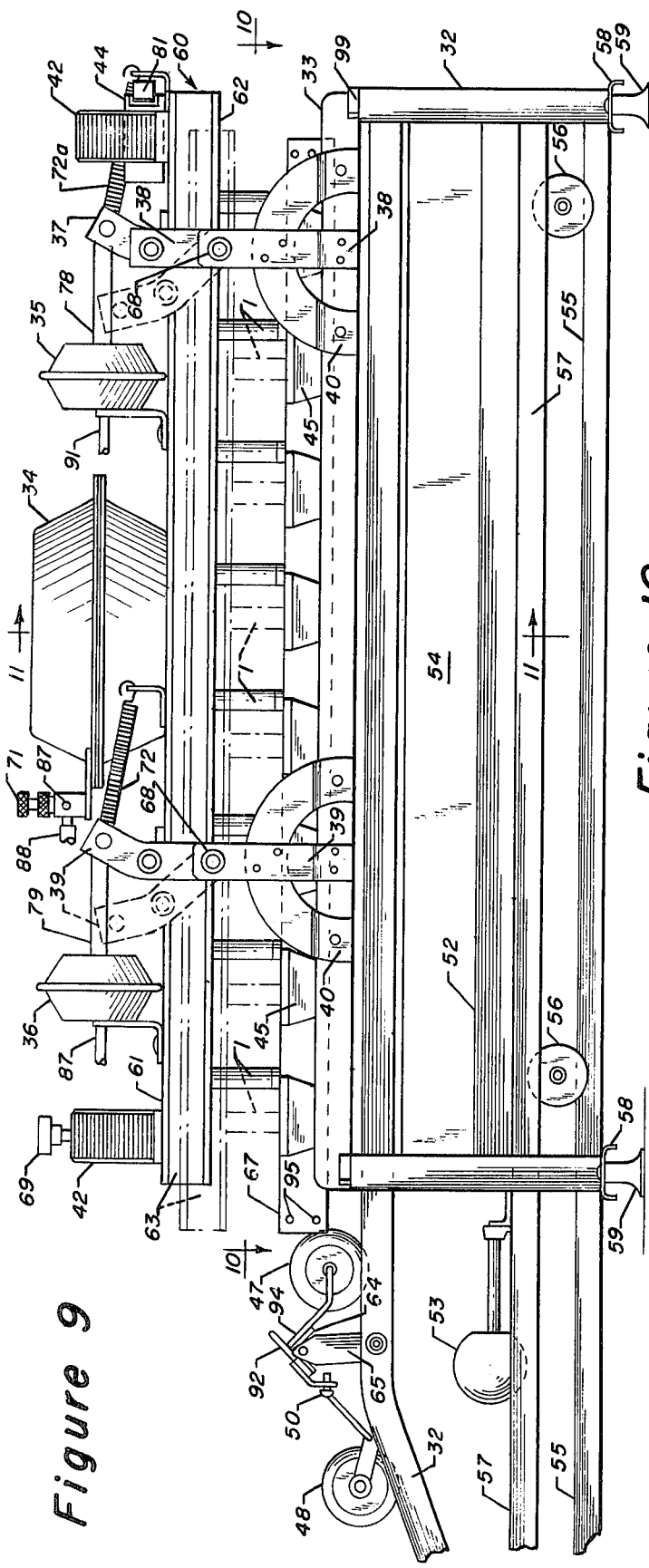
FIG. 9 is intended to be a partial right-side view of the seed planter as shown in FIG. 7, including furrow rollers 47 and furrow-covering rear rollers 48.

Briefly referring to FIG. 11, which is a partially-sectioned elevation taken substantially along the line 11—11 of FIG. 9, it will be seen that planting valves 1 are attached to the lower plate 62 of a vacuum chamber 60 by way of threaded portions 3. The internal open annular areas of valve 1 are thus placed in open communication with the vacuum chamber via apertures 4. Also, as hereinafter described with specific reference to FIG. 11, upper shaft extremity 5a is caused to abut a "floating" center plate 100 which is confined within vacuum chamber 60.

Figure 4:
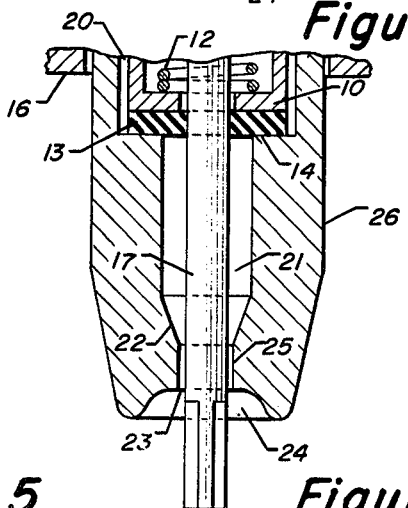
FIG. 4 is another partially-sectioned view of the lower portion of the nozzle, and shows the next operational phase where coil spring 9 activates cleaning wire 17 to the extent that it protrudes through recessed opening 24 to clean dust, etc. therefrom.

Center shaft 5 is enlarged over an internal upper section to provide a travel stop 6 which inhibits the excessive upward travel of center shaft 5 outside the confines of housing 2 as a result of coil spring 9 being biased in that direction. Travel stop 6 also forms an internal annular-form area 18 which communicates with the vacuum chamber by way of apertures 4. In order to align and stabilize the internal elements of planting valve 1, with respect to inhibiting horizontal movement, shaft 5 is further enlarged at 7. Generally, stabilizer 7 will not be circular in cross section, but will assume an irregular shape to permit air flow through the narrowed annulus, formed with the inner wall of housing 2, into the upper annular area 18. Coil spring 9 is preferably situated around the central portion 8 of shaft 5, and creates another annular-form area 19 from which air flows into annular area 18. Coil spring 9 is biased against the bottom surface of stabilizer 7, and serves to actuate and control cleaning wire 17 in the manner hereinafter set forth in greater detail. Briefly, however, its principal function is to cause cleaning wire 17 to extend into and through the recessed nozzle end 24 of valve 1 (as shown in FIG. 4) and also to retract the same substantially to the position shown in FIG. 1.

Preferably, an internal housing 10 surrounds center shaft 5 immediately below cental shaft portion 8, being utilized to contain an upper travel stop 11 and a second, smaller coil spring 12. Housing 10 and its contents have limited vertical movement with respect to the center shaft 5, the movement being restricted by the shut-off valve facing 14 and travel stop 11. The principal function of coil spring 12 is to actuate shut-off valve 13 to effect contact thereof with valve facing 14 which essentially causes a cut-off, or release of the vacuum within internal annulus 21 of nozzle 26 such that the end 24 of the nozzle is exposed to atmospheric pressure. The shut-off valve 13 is preferably fabricated from a resilient or semi-rigid material such as rubber, polyvinyl, Teflon, or other suitable composition which possesses sufficient flexibility to form a substantially air-tight seal with valve facing 14. As illustrated, shut-off valve 13 is not physically permanently attached to the lower face of internal housing 10, or to center shaft 5; this facilitates replacement of the gasket-type valve as the need arises. Planting valve 1 and its component parts are maintained in the illustrated configuration by providing housing 2 with threaded portion 15 at its lower extremity, and adapting threaded cap 16 thereto.

It should be noted that threaded cap 16 also maintains nozzle 26, which protrudes through the lower extremity of housing 2, into contact therewith. The lower extremity of center shaft 5, extending from the travel stop 11, is narrower than the remainder of the shaft in order to provide a nozzle cleaning wire 17 which is utilized to remove dust, dirt, seed hulls, etc., from recessed nozzle end 24. The end of cleaning wire 17 terminates in a portion which is non-circular in cross-section as shown in FIGS. 1 through 5. The interior wall of nozzle 26 forms a nozzle annulus 21 with cleaning wire 17, which annulus is narrowed by frusto-conical section 22 to provide an internal guide 25 for the cleaning wire. Furthermore, the openings 23, between the end of cleaning wire 17 and guide 25 are thereby made significantly smaller to enhance the adherence of a minimum number of seeds to the recessed end 24 of nozzle 26.

Figure 2:
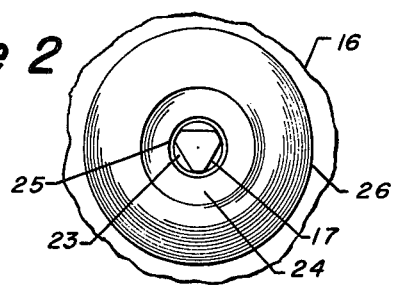
FIG. 2 is a partial view of the end of the nozzle 26, enlarged to show clearly the preferred configuration of the cleaning wire 17.

FIG. 2 is a partial view of the end of nozzle 26 enlarged to present clearly the irregular shape of the lower portion of cleaning wire 17 and its relationship to guide 25 and recessed opening (cusp) 24. In the illustrated valve, the irregular shape is substantially triangular with the apices being shaved. Essentially, this configuration forms three very small openings 23 to which the seeds adhere. Although the triangular shape is most suitable for planting from about three to about five seeds, the irregular shape may also take the form of a square, oblong, hexagon, octagon, pentagon, etc. I have found that the illustrated triangular shape is most preferred in order to enhance the operation and function of the seed-planting valve.

Figure 3:
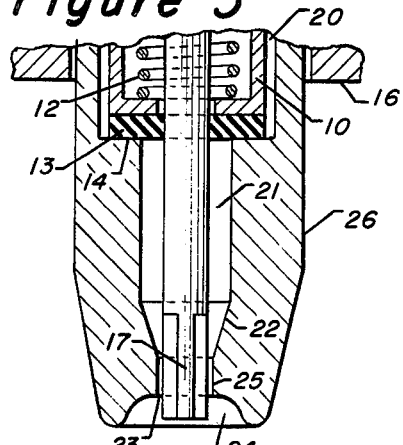
FIG. 3 is a partially-sectioned view showing a portion of nozzle 26 with shut-off valve 13 in a closed position. At this stage, it should be noted that cleaning wire 17 is substantially flush with the nozzle opening.

FIGS. 3 and 4 are partially-sectioned views of the nozzle 26, and are presented to illustrate the operational phases, in conjunction with FIG. 1, of cleaning wire 17. That is, FIGS. 1 through 4 are intended to represent the same valve. In phase I of the operation of valve 1, the configuration is that shown in FIG. 1, with apertures 4 being in communication with a vacuum source or chamber. In short, shut-off valve 13 is in the open position permitting annulus 21 to be in open communication with the relatively narrow annulus 20 formed by the interior of nozzle 26 and the outer surface of internal housing 10. Air is caused to flow into cusp 24 and into openings 23; the seeds to be planted adhere (due to continuing suction), but not to the extent that openings 23 are entirely closed. Air flows upwardly through annulus 21, beneath shut-off valve 13 and into annulus 20; there is, of course, a slight flow of air within internal housing 10. From annulus 20, the air flows into area 19 in which coil spring 9 is disposed, and therefrom around stabilizer 7 into annular chamber 18, to be discharged from the interior of planting valve 1 through apertures 4. In one application, or integration of the valve 1 into a planter, a vacuum always exists above shut-off valve 13 and valve facing 14, even when valve 13 is in the closed position. When valve 13 closes, only the downstream portion of nozzle 26 is exposed to atmospheric pressure.

The second phase commences with shaft 5 being pushed downwardly into housing 2, or toward the nozzle end. Although the steps of this operational phase have the appearance of occurring virtually simultaneously, there is an actual, but very short time delay. First, as shaft 5 commences its downward movement, both coil springs 9 and 12 begin to assume a compressed state. Spring 12 completes its function first — this is to cause shut-off valve 13 to seat against valve facing 14, whereby the vacuum is released from annulus 21. Since nozzle recessed openings 24 are then exposed to the existing atmospheric pressure, the seeds fall therefrom into the soil. At this instant, the nozzle 26 and lower section of internal housing 10 are in the position shown in FIG. 3. It should be noted that the terminus of cleaning wire 17 is substantially flush, or even with the recessed opening 24 of nozzle 26. Almost immediately, coil spring 9 becomes compressed to the extent that cleaning wire 17 commences to proceed downwardly and extends a finite distance out of opening 24, as is shown in FIG. 4. This action removes any dust, soil and/or seed hulls which would otherwise accumulate to clog openings 23. It is essential that shut-off valve 13 continues to seat during this phase; otherwise, the existence of the vacuum would prevent complete cleaning. The necessity and function of the two coil springs is readily apparent. A single spring, as shown in the prior art previously discussed, is inadequate and not successful in performing this operation.

The third operational phase reverses the foregoing; that is, as shaft 5 is released, coil spring 9 retracts to the extent that cleaning wire 17 is withdrawn to the position of FIG. 3. Shut-off valve 13 continues to assume a closed position at this stage, and remains closed until shaft 5 releases to the extent that coil spring 12 retracts to open the same. Almost simultaneously, coil spring 9 expands further to cause cleaning wire 17 to retract to the locus shown in FIG. 1. The valve is then positioned to perform another seed-planting cycle.

Figure 5:
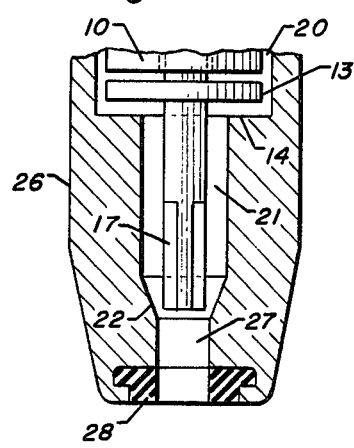
FIG. 5 illustrates a modification of only the end of the nozzle and cleaning wire for use in planting relatively large seeds singly. The nozzle end is modified by the insertion of a flexible gasket 28.

As previously set forth in this specification, valve 1 can easily be adapted to plant successfully seeds having a wide range of sizes and shapes. For illustration purposes only, and not with the intent to limit the present invention, the valve 1 of FIGS. 1 through 4 is extremely well-suited for planting from two to about five seeds of the size characteristic of cabbage, ageratum, portulaca and/or nicotiana (the last three being flower seeds). FIG. 5 is a partially-sectioned view only of a portion of nozzle 26 to illustrate a modification of the nozzle end 24 and the cleaning wire 17. It is intended to permit planting the larger seeds singly; these would include sizes approximating cabbage, pepper and/or tomato seeds. In this modification, the irregularly shaped end of cleaning wire 17 is shortened to the extent that the terminus thereof is now proximate to the frusto-conical section 22. End gasket, or washer 28 is provided to restrict the capacity of nozzle opening 27 to a single large seed. The principal utility of this modified valve resides in field planting.

Figure 6:
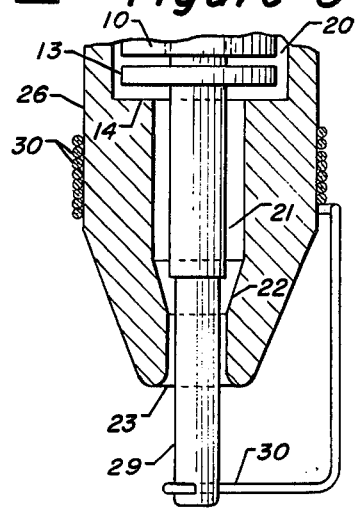
FIG. 6 is illustrative of another modification, principally directed toward cleaning wire 17, plus the addition of stationary, external cleaning means 30. This modification is intended for specific utilization in the planting of small, dust-like seeds.

FIG. 6 is a partially-sectioned view of nozzle 26 which has been modified to permit planting from two to about five dust-like seeds having an extremely small nominal diameter — e.g. lobelia seeds. In this modification, the cleaning wire 29 takes a substantially circular form throughout its entire length and protrudes permanently beyond the end of nozzle 26 to further restrict seed-retaining openings 23. A second beneficial modification involves the addition of an external cleaning wire, or means 30 which is conveniently coiled around nozzle 26, terminating in a single loop proximate to the end of cleaning wire 29. The latter is cleaned of dust, soil and other minute particles by the "wiping" action exerted by the loop. The cleaning wire is enlarged over that portion extending from internal housing 10 to frusto-conical section 22. The diameter closely approximates that of the nozzle opening to further enhance the cleaning effect.

Figure 7:
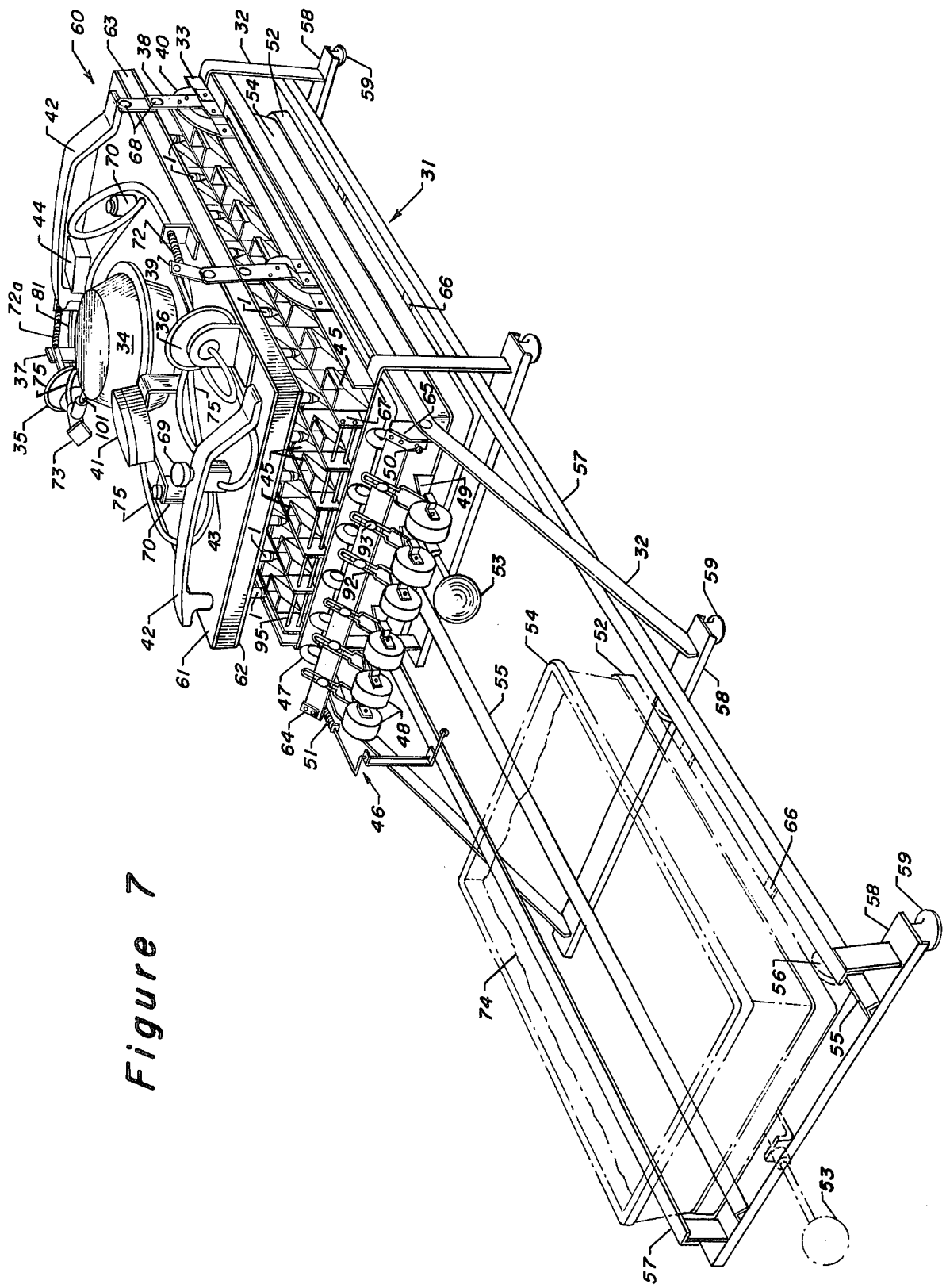
FIG. 7 illustrates, in a perspective view, one type of seed planter for which the valves of FIGS. 1 through 6 are intended. Numeral 31 refers to the entire device, including the planting apparatus, the planter stand 32, the nursery flat 54 (which is shown in phantom) and the extension of stand 32 which is employed to position nursery flat, or tray 54 beneath the seed planter frame support structure 33. Numeral 46 is intended to refer to the entire linkage, of which spring 51 is a part, which linkage serves to actuate furrow rollers 47 and the furrow-closing rollers 48. This linkage is described in detail in FIGS. 12 through 14. Wheels 56 are grooved (not shown in this view) to adapt to tracks 55.

FIG. 7 illustrates, in a perspective view, one type of seed planter for which the valves of FIGS. 1 through 6 are intended. Numeral 31 refers generally to the entire apparatus including planter stand 32, nursery flat 54, shown in phantom at the rear of the planter stand, and the extension of stand 32 having rails, or tracks 55 employed to position the nursery flat beneath the seed planter frame and support structure 33. Numeral 46 is intended to indicate an entire linkage (shown in greater detail in FIGS. 12, 13 and 14), of which spring member 51 is a part. Linkage 46 serves to actuate furrow-creating rollers 47 and furrow-closing rollers 48. Wheels 56, attached to nursery flat rack 52, are grooved to adapt to the apex of rails 55. Additionally, numeral 60 is intended to allude to the vacuum chamber, or box, which is formed by upper plate 61, lower plate 62 and a peripheral frame member 63. Upper vacuum chamber plate 61 has a pair of handles 42 attached one each at both narrow ends; these permit the entire seed planter, including frame 33 and the plurality of seed storage hoppers 45 to be lifted from the planter stand 32, and used as a portable planting device. Vacuum hoses, or conduits are collectively indicated in this view by the numeral 75 — these are delineated and specifically designated numerically in FIG. 8, a plan view of the seed planter. The planter stand 32 is stabilized to prevent misalignment of the various elements by means of horizontal stand support beams 58 which are equipped at each end with leveler feet 59.

Specifically referring now to FIG. 7, a plurality of seed-planting valves 1 are attached (by way of threaded portions 3 shown in FIG. 1) to the lower plate 62 of vacuum chamber 60. The number of valves 1, in any given device as illustrated, will depend upon the number of plants intended for the nursery flat 54. Most common is a flat containing eight smaller flats, each of which is divided into six individual sections — a total of 48. Also somewhat prevalent is a nursery flat having seventy-two individual planting sections, or areas; the precise number is not, of course, essential to the present invention. Suffice to state that the number of valves employed in the seed-planting device, as illustrated, is equal to the number of seed storage hoppers 45 and seed supply bins 45a which are disposed within the confines of the seed planter frame 33.

As previously stated, the illustrated seed-planting device 31, employing the seed-planting valve 1 of the present invention, is specifically intended for utilization in preparing the common planted nursery flat. In functioning as such, the nursery flat 54, containing a single bed of planting soil 74 — individual planting sections are not herein illustrated — is placed within the confines of the nursery flat rack 52 which is equipped with a convenient handle 53. Rack 52 is adapted with wheels 56 which are designed (via V-grooves) to engage triangular track members 55. Nursery flat rack 52 is further equipped with a plurality of channel guides 66 which further stabilize the rack as it carries the nursery flat 54 beneath the seed planter frame; guides 66 are employed in conjunction with travel guide channels 57. The nursery flat 54 is placed beneath the seed-planting valves 1 through the simple expedient of using handle 53 to guide the nursery flat rack 52 along the rails 55.

As nursery rack 52 and flat 54 traverse the extension of planter frame 32, linkage mechanism 46, with which coil spring 51 coacts, is actuated. As is hereinafter described in greater detail while referring to FIGS. 12, 13 and 14, the function of furrow linkage 46 is to activate the action of furrow rollers 47 and furrow-closing rollers 48 as the nursery flat is (1) placed beneath the seed planter and, (2) removed therefrom following the end of a given seed-planting operation. When linkage 46 is actuated, roller mounting bar 64 commences a forward circular motion which causes furrow-making rollers 47 to contact the planting soil 74, thereby creating the furrowed areas into which the seeds are planted. When the rack 52, and the "planted" nursery flat 54 are withdrawn from beneath the seed planter, furrow-closing rollers 48 are caused to contact the soil 74, thereby closing the furrow with the assistance of roller wing guides 49 which serve to channel the soil into the furrow and beneath the rollers 48. Adjustable frame supports 92, for furrow-closing rollers 48, are attached to mounting bar 64 through the use of suitable fastening means 93. The depth to which furrow-closing rollers 48 must go in order to close the furrows, is adjustable by way of screw means 50, a second one of which may be installed on the opposite end of mounting bar 64. As clearly shown in FIGS. 12, 13 and 14, hereinafter described in particularity, furrow-roller mounting bar 64 is shaped as an inverted "V," being supported at both ends by mounting bar supports 65. Also, furrow-making rollers 47 are provided with adjustable frame supports which are disposed on the blind side (hidden in this view) of mounting bar 64.

Figure 10:
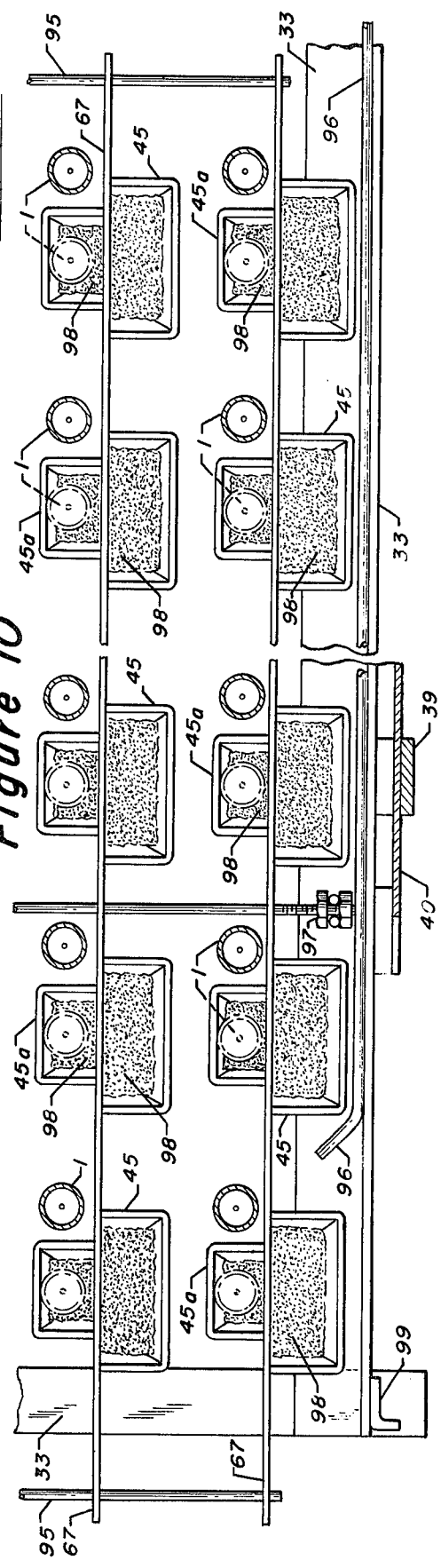
FIG. 10 is a partially-sectioned view taken substantially along the line 10—10 of FIG. 9.

Situated within the confines of the seed planter frame 33 is a seed carrier frame, also hidden in this particular view, but referred to by numeral 96 in FIG. 10, which is adapted by vertical support members 67, along its entire length, and perpendicular support rods 95 to segregate the individual seed storage hoppers 45, as well as the attached seed supply bins 45a (shown in FIG. 11). The areas between hoppers 45 and support members 67 are open to the planting soil 74 below. The source of the vacuum, to which some of the various vacuum hoses 75 are connected, has not been illustrated. As is more clearly shown in FIG. 8, a plan view of the planter, only three of the vacuum hoses 75 are connected directly to the vacuum source. With brief reference to FIG. 8, the vacuum source is connected to the seed-planting device at male fitting 82. The three vacuum hoses directly connected thereto lead to valve and switch box 44 (vacuum hose 83), switch box 43

(hose 89), to which vacuum switch button 69 is attached through rear planter handle 42, and to vacuum regulator 77 (hose 90), which is connected to one of the four spring housings 70, for regulating the degree of vacuum within vacuum chamber 60. After nursery flat 54 has been properly positioned below the seed carrier frame, the operator initiates the planting operation by depressing vacuum switch button 69, thereby activating a valve in vacuum switch box 43 such that the latter is in communication with the vacuum source 82. In normal operation, vacuum regulator 77 is always open such that the interior of vacuum chamber 60 is constantly under a subatmospheric pressure.

A second hose connects switch box 44 to a vacuum regulator 73 which communicates with the interior of vacuum motor 34. This controls the degree to which center plate 100, in vacuum chamber 60, is raised by diaphragm 103 (refer to FIG. 11). As above stated, the vacuum source 82 is connected to vacuum regulator 77 disposed on one of the four spring housings 70. A second spring housing 70 is fitted with a vacuum hose which leads to vacuum gauge 41; with respect to the two remaining spring housings 70, a preferred embodiment involves connecting these with a vacuum hose 85 to achieve uniformity of air flow from the vacuum chamber 60. A second hose from vacuum switch box 43 communicates with speed regulator 71 which is conveniently disposed upon the flanged portion of vacuum motor 34, and which regulates the seed-planting time cycle. Two separate vacuum hoses lead from speed regulator 71 to the two diaphragm vacuum valves 35 and 36 which are situated diagonally at the front left-side and rear right-side of the seed planter. A third vacuum hose 88 connects speed regulator 71 with vacuum switch box 43. As detailed below, movement of the seed planter, rearwardly and downwardly, such that nozzles 26 of the planting valves 1, contact the seeds in seed supply bins 45a, is effected by the two diaphragm vacuum valves 35 and 36. Movement occurs as a result of the force being applied to left-side, front hinge means 37 and right-side, rear hinge means 39 which are equipped with hinge pins 68 and supported on seed planter frame 33 through the use of semi-circular support plates 40. At the two opposite corners, right-side front and left-side rear, two additional hinge means, 38 and 76 (the latter being hidden in this view), are provided; these are employed for stability, and are not connected to diaphragm vacuum valves. When the operator releases button 69, coil spring members 72 and 72a assist in returning the four hinges to the seed-planting and nozzle-cleaning position.

Figure 8:
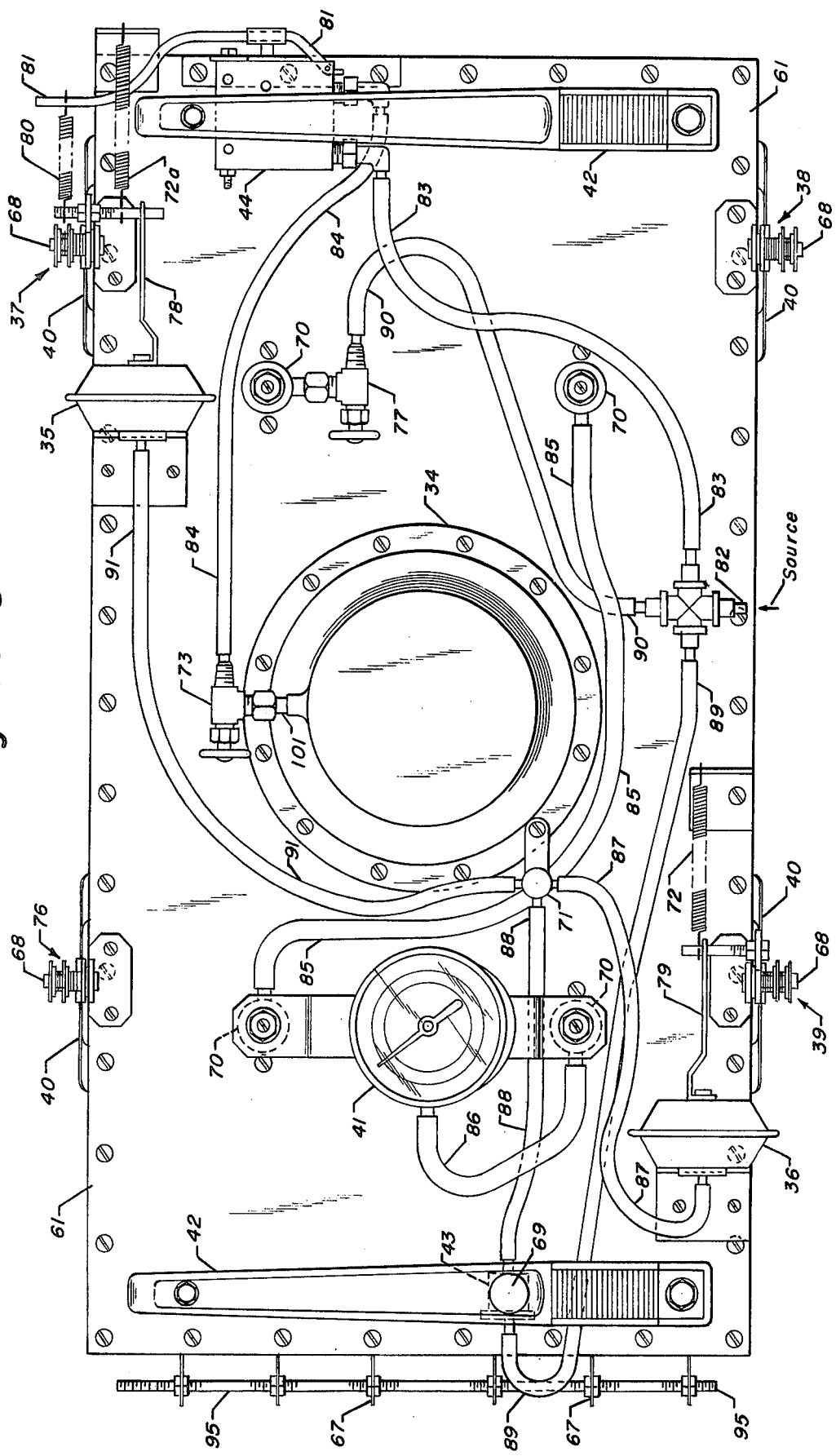
FIG. 8 is a plan view of that portion of the overall seed planter which is removable from the planter stand 32, and can function as a portable device. In this view, only the upper vacuum chamber plate 61 is shown; all the illustrated components are suitably attached to the upper plate with the exception of hinge means 37, 38, 39 and 76, which are attached to seed planter frame 33 by way of hinge support plates 40.

As above set forth, FIG. 8 is a plan view of that portion of the overall seed planter which is removable from planter stand 32. In this view, only the upper vacuum chamber plate 61 is shown; all the illustrated components are suitably attached thereto with the exception of hinges 37, 38, 39 and 76, which are attached to seed planter frame 33 by means of hinge support plates 40. In the following description, it will be presumed that vacuum regulator 77, attached to one of the spring housings 70, has been pre-adjusted in accordance with the number of seeds each nozzle is intended to plant, and that speed-regulating valve 71 has been pre-set to govern the desired rate at which the seed planter moves horizontally (to the left side in this view) and downwardly to pick up seeds and return to the static position for (1) discharge of the seeds into planting soil 74 and, (2) activation of cleaning wire 17. When the operator depresses switch button 69, to actuate vacuum switch box 43, the vacuum from source 82 is applied to speed regulator 71 by way of vacuum hose 88. In turn, the subatmospheric pressure is applied to diaphragm vacuum valve 35 via vacuum hose 91 and to diaphragm vacuum valve 36 via vacuum hose 87. This causes a "pulling" force to be applied to rigid plunger arms 78 and 79 such that they actuate the hinges 37 and 39 which, in conjunction with hinge means 38 and 76, cause vacuum chamber 60 to travel horizontally and downwardly, to the left and into seed supply bins 45a (refer to FIGS. 9 and 10). Virtually simultaneously, the resulting movement of coil spring 80, which is biased toward trigger arm 81, causes the latter to release the switch in vacuum switch box 44. Vacuum from vacuum hose 83 and vacuum source 82 is applied to vacuum motor 34 by way of vacuum hose 84 and vacuum regulator 73. This causes center plate 100 (refer to FIG. 11) to raise and thus release the center shaft 5 of planting valve 1 which results in an opening of the shut-off valve 13. Seeds are picked up in the amount which is determined by the degree of vacuum in vacuum chamber 60, as permitted by regulator 77 with which vacuum hose 90 communicates from vacuum source 82. Each of the four spring housings 70 contains a spring which contacts the lower surface of center plate 100. Since these are not essential to the present invention, they have not been illustrated.

During the entire portion of the foregoing operation, button 69 has been maintained in a depressed position. Upon release thereof by the operator, coil springs 72 and 72a, which are biased away from vacuum valves 35 and 36, return the seed planter to the indicated position, at which the seed nozzles are disposed over an open area to the planting soil below (refer to FIGS. 9 and 10). Since the seeds must necessarily be retained at the tips 24 of the seed-planting valves 1, the tips must be under subatmospheric pressure during the period when the planter is returning to the indicated position. The illustrated device permits this since coil spring 80 has not as yet compressed to the extent that trigger 81 is caused to actuate the switch in vacuum switch box 44. In effect, therefore, one embodiment of my invention affords a time delay via coil spring 80, trigger 81 and the vacuum switch box 44. Virtually simultaneously, however, with the return of the planter, trigger 81 effects a closing of the switch in vacuum switch box 44 such that center plate 100, within vacuum chamber 60, forces shaft 5 downwardly through valve 1 to (1) close shut-off valve 13 and, (2) activate cleaning wire 17. In order to provide uniformity within the vacuum chamber 60, vacuum hose 85 connects two of the four spring housings 70. To facilitate the adjustment of the vacuum in vacuum chamber 60, via regulator 77, vacuum hose 86 is provided between one of the spring housings 70 and vacuum gauge 41.

FIG. 9 is a partial right-side view of the seed planter as presented in FIG. 7, including furrow-making rollers 47 and furrow-closing rollers 48. The phantom lines in FIG. 9 are intended to be illustrative of the position assumed by the seed planter shortly after button 69 has been initially depressed by the operator. It will be noted that the movement to the left is a combination of horizontal and downward motions such that the nozzles 26 move over and into seed supply bins 45a which are hidden in this view behind the horizontal support members 67, the latter being held in position by support rods 95. The manner in which rollers 47 and 48 are attached to mounting bar 64 is schematically indicated in the use of frame supports 94 and 92, respectively. The furrow-closing roller adjustment screw 50 is aligned such that the end thereof will abut the edge of mounting bar 65 as rollers 48 move in a downwardly direction when the planted nursery flat 54 is being withdrawn from beneath the seed planter.

FIG. 10 is a partially-sectioned view taken substantially along the line 10—10 of FIG. 9, and is presented principally to illustrate the configuration of seed storage hoppers 45 and the seed (98) supply bins 45a. It should be noted that these are in line with each other on opposite sides of horizontal support members 67 which are held in proper position through the use of support rods 95. These, as well as horizontal members 67, are mounted to the seed storage support flame 96 by way of mountings 97. The seed storage and supply receptacles are removable as a single unit, along with the frame 96 for the purpose of replenishing the same with additional seeds. This is readily accomplished by removing the entire seed planter from planter stand 32, using side handles 42. The seed storage unit is then withdrawn from the illustrated left-hand side. Bracket 99, of which there are four, is employed in centering and stabilizing the seed planter and frame 33 on the planter stand 32.

FIG. 11 is a partially-sectioned view taken substantially along the line 11—11 of FIG. 9. The principal purpose of this view is to illustrate the relationship of vacuum motor 34 to center plate 100 through the use of a center shaft 102 and a diaphragm 103. Therefore, with respect to the elements attached to upper plate 61 of vacuum chamber 60, only vacuum motor 34 has been illustrated. Fitting 101 is adapted to receive vacuum regulator 73 which is not shown in this view. The horizontal movement of the seed planter, when vacuum switch button 69 is depressed, is towards the viewer, with the phantom lines indicating the degree of downward movement of the valves 1 into seed supply bins 45a, and of the vacuum chamber 60. At this stage of the operation, in order that the cleaning wire 17 be retracted and shut-off valve 13 opened such that the end of the nozzle 26 is capable of picking up the desired quantity of seeds 98 from supply bins 45a, center plate 100 is not forcing shaft 5 in a downward direction. Referring to vacuum motor 34, when the vacuum is applied through connection 101 in the area above diaphragm 103, the weight of center plate 100, connected to the diaphragm via center shaft 102 is not being borne by the center shaft 5 of valve 1, and the latter is capable of picking up seeds. This view also shows the unitary construction and relationship of seed storage hoppers 45 and seed supply bins 45a, and which are separated by horizontal support members 67 being integral therewith. It should be noted that members 67 do not extend downwardly to the extent of completely separating hoppers 45 and seed supply bins 45a. By terminating a finite distance above the bottom of bins 45a, there is provided a plurality of seed flow control openings 104 between the supply bins and the storage hoppers.

When the operator releases button 69, the seed planter returns to its original position over the open area behind seed supply bins 45a. The time delay switch cuts off the vacuum from vacuum motor 34, the weight of center plate 100 forces it against the center shafts 5 of valves 1, shut-off valve 13 closes and the seeds fall into furrows 105 which were made in planting soil 74. Almost immediately, cleaning wire 17 (not illustrated in this view) extends through the nozzle to remove the hulls, dust, etc. which also will fall into the furrows 105. When the nursery flat is removed, the wing guides 49 force the side mounds of soil into the furrows and under furrow-closing rollers 48. Numeral 106 merely denotes a portion of the mounting by which wheels 56 are attached to nursery flat rack 52.

Figure 12:
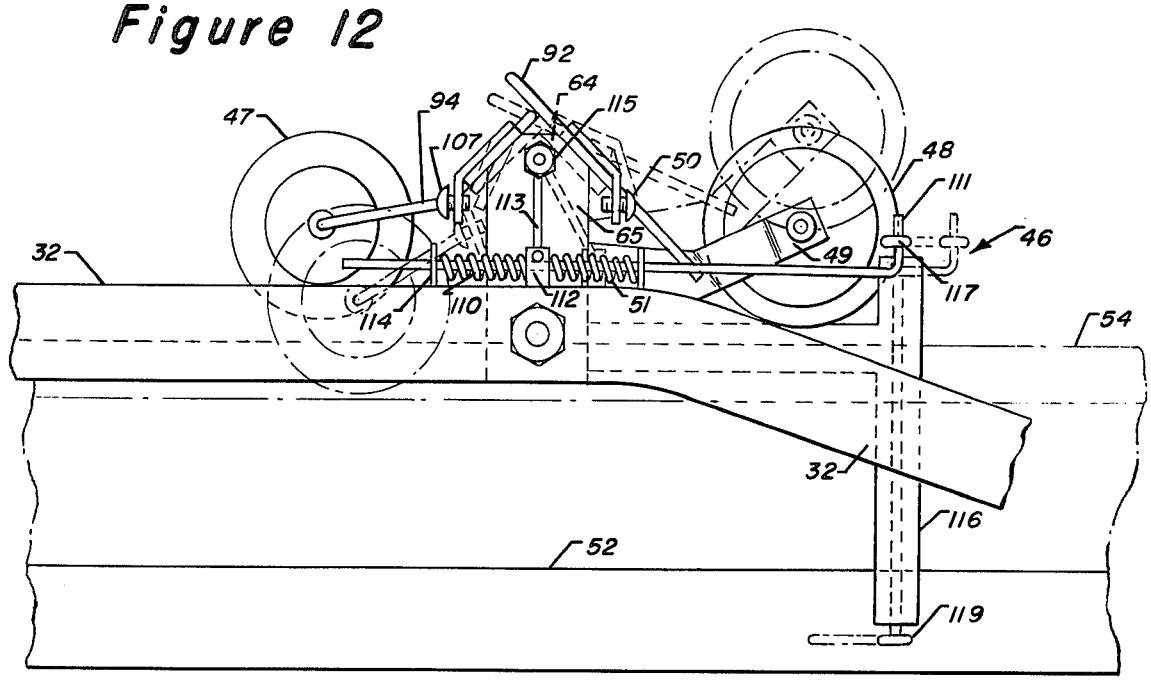
FIG. 12 is a partial left-side view which has been enlarged to show the details of the linkage 46. The phantom lines are intended to indicate the movement of furrow rollers 47 and furrow-closing rollers 48 as the nursery flat is being inserted beneath the seed planter.
Figure 13:
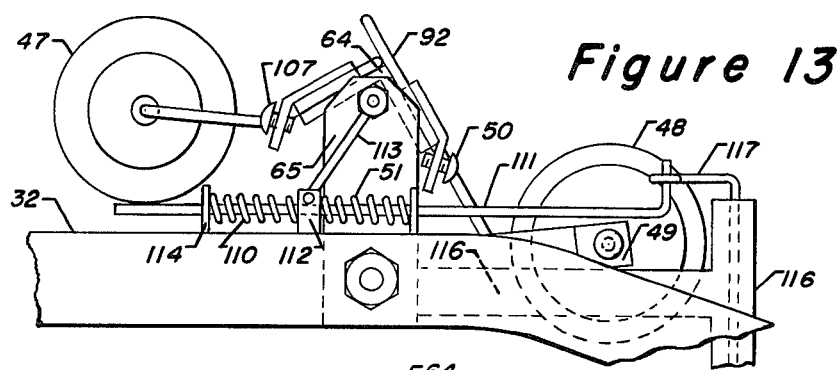
FIG. 13 shows the structure of FIG. 12 and relative positions of rollers 47 and 48 after the seeds have been planted and the nursery flat is being withdrawn from under the seed planter.

FIGS. 12 and 13 are enlarged left-side views of furrow rollers 47 and 48, and are presented to show in detail the entire linkage 46 as well as its function. Specifically referring to FIG. 12, the phantom lines indicate positions of the rollers and other elements when lower horizontal trigger 119 is tripped by rack 52 as the nursery flat 54 is being rolled beneath the seed planter. Furrow-making rollers 47 are lowered into the soil 74, to a depth which can be selected through the use of adjustment screw 107 which is set so that its end will abut the edge of mounting bar 65 as rollers 47 move in a downwardly direction. Coil spring 110 controls the pressure imposed upon furrow-making rollers 47; likewise, coil spring 51 controls the pressure imposed upon furrow-closing rollers 48. Control in both of these instances is adjusted by lock washers 114 which regulate the tension on coil springs 51 and 110. As lower horizontal trigger 119 is tripped, a vertical connecting rod, hidden within mounting 116, coacts with upper horizontal linkage 117 to lower rollers 47 by pulling on push-pull rod 111. Universal joint 112 transfers the resulting motion to control arm 113 which effects rotation of axle 115 of roller mounting bar 64.

FIG. 13 illustrates the relative positions of the rollers 47 and 48, and linkage 46 after the seeds have been planted and the nursery flat 54 is being withdrawn from under the seed planter. Trigger 119 is again tripped in the opposite direction by rack 52. Furrow-closing rollers 48 and wing guides 49 have been lowered to the selected depth as determined by adjustment screw 50, necessary to cover the planted seeds with the planting soil 74. As hereinbefore set forth, the wing guides 49 serve to channel the soil under the furrow-closing rollers 48.

Figure 14:
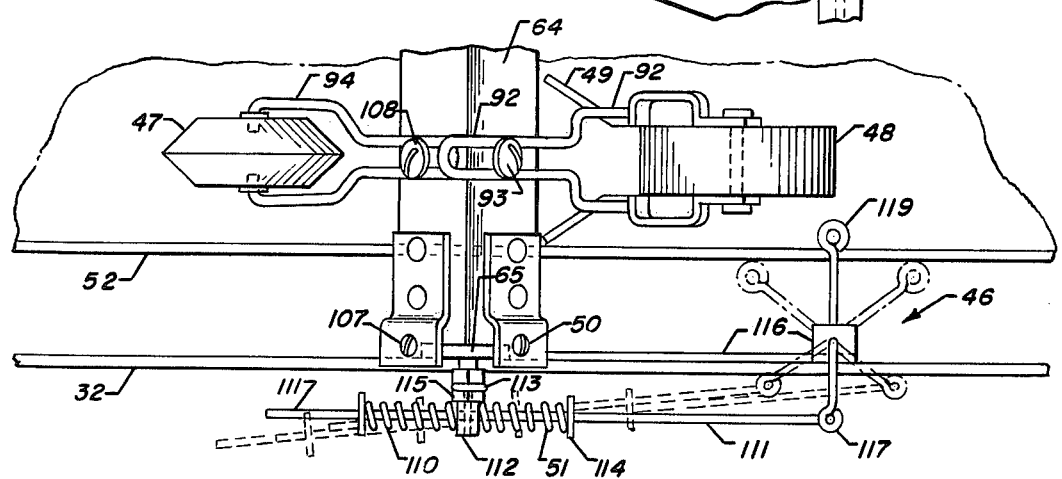
FIG. 14 is a partial plan view illustrating the roller tool bar 64 and the method by which the furrow rollers 47 and closing rollers 48 are attached thereto. Furrow-closing guide, or wings 49 are used to direct the mounds of soil into the furrow and under rollers 48.

FIG. 14 is a partial plan view enlarged to show mounting bar 46 and the means by which furrow-making rollers 47 and furrow-closing rollers 48 are attached thereto via mounting frames 94 and 92, and fastening means 108 and 93, respectively. It will be noted that the illustrated arrangement permits additional adjustment of roller depth. Also shown, in phantom, are the positions assumed by linkage 46 when the nursery flat is being inserted beneath the seed planter and withdrawn therefrom.

The foregoing specification, particularly when read in light of the accompanying drawings, is believed to present a concise definition and clear understanding of the seed-planting valve and nursery flat planter encompassed by the present invention.

I claim as my invention:

1. A vacuum-operated seed planter which comprises, in cooperative combination with a vacuum source:
    (a) a sealed box-like vacuum chamber (i) having separated parallel upper and lower surfaces and, (ii) communicating with said vacuum source via first conduit means containing a first regulating valve for adjusting the vacuum within said chamber;
    (b) a center plate disposed between said upper and lower surfaces, and freely vertically movable within said vacuum chamber;
    (c) vacuum-operated diaphragm valve first motor means (i) communicating with said vacuum source via second conduit means containing a second regulating valve for adjusting the vacuum within said first motor means, (ii) connected by shaft means, through the upper surface of said vacuum chamber, to said center plate and, (iii) effecting vertical movement thereof within said vacuum chamber;

(d) a plurality of spaced-apart, seed planting valves connected to the lower surface of said vacuum chamber, said valves (i) having a hollow core housing, a plurality of apertures in the upper end portion thereof, such that said hollow core is in open communication with said vacuum chamber, and a coaxially-disposed center shaft vertically-movable within said hollow core and extending through the upper end of said housing, and, (ii) contacting said center plate, within said vacuum chamber, at the upper extremity of said center shaft;

(e) a seed planter frame containing a plurality of spaced-apart seed storage hoppers;

(f) guide supporting means, in which said seed-planting frame is positioned, (i) disposed a finite distance below the lower surface of said vacuum chamber and, (ii) in turn removably supported by an elongated, substantially rigid frame member containing a movable nursery flat rack, guide means and a soil-containing nursery flat for positioning the rack and nursery flat beneath said seed-planting frame;

(g) a pair of vacuum operated diaphragm valve second motor means (i) attached to opposite edges of said vacuum chamber and, (ii) communicating with said vacuum source via third conduit means containing a third regulating valve for adjusting the vacuum within said pair of second motor means;

(h) vertically-aligned biased hinge means (i) attached to said vacuum chamber and said supporting guide means and, (ii) in hinged connection to said pair of second motor means, said biased hinge means effecting simultaneous horizontal and downward movement of said vacuum chamber with respect to said supporting guide means;

(i) a first plurality of rollers (i) supported by said rigid frame member, (ii) the axis of rotation of which is disposed at right angles to the direction of travel of said nursery flat and, (iii) forming seed-receiving furrows in said soil as the flat is being positioned beneath said seed planting frame; and, (j) a second plurality of rollers (i) supported by said rigid frame member, (ii) the axis of rotation of which is disposed at right angles to the direction of travel of said nursery flat and, (iii) closing said furrows after seeds have been planted and the flat is being removed from beneath said seed planting frame.

2. The seed planter of claim 1 further characterized in that one of said pair of diaphragm valve second motor means is connected to time-delay, vacuum cut-off switching means which releases the vacuum within said first motor in response to the action of said one diaphragm valve second motor means.

3. The seed planter of claim 1 further characterized in that said rigid frame member contains trigger and linking means (i) activating said first plurality of rollers when the nursery flat is positioned beneath said seed-planting frame and, (ii) deactivating said first plurality of rollers and activating simultaneously said second plurality of rollers.

4. A self-cleaning, seed-planting valve which comprises, in cooperative combination:

(a) an elongated housing having (i) a hollow core and, (ii) a plurality of apertures, communicating with said hollow core, in the outer periphery of the upper end portion thereof;

(b) a nozzle removably connected to the lower end portion of said elongated housing, and having (i) an upper internal diameter less than said hollow core at the juncture thereof with the lower end portion of said housing and, (ii) a lower internal diameter less than said upper internal diameter, providing a substantially flat valve-seating surface in the horizontal plane where said upper internal diameter is reduced;

(c) a center shaft coaxially-disposed within said hollow core and vertically, freely movable therein, and (i) extending upwardly and protruding through an aperture in the upper end of said housing, and, (ii) being reduced in cross section at its lower end, at least a distance equal to the length of said nozzle, said reduced center shaft portion providing a cleaning wire disposed throughout the length of said nozzle, the lower internal end of said nozzle being further reduced via a frusto-conical section proximate to the end thereof, providing thereby an internal guide for said cleaning wire;

(d) a first center shaft travel stop within said hollow core and immovably attached at the upper end portion of said center shaft proximate to the upper end of said cylindrical housing;

(e) an internal housing, having upper and lower ends and an external diameter less than the upper internal diameter of said nozzle, and disposed proximate to the juncture of said nozzle with said elongated housing, said internal housing containing (i) a second center shaft travel stop immovably attached to the center shaft proximate to the upper end of the internal housing and, (ii) a first coil spring surrounding the center shaft along the reduced portion thereof within said internal housing;

(f) a second coil spring, having a length and diameter greater than those of said first coil spring, surrounding said center shaft, contacting said first travel stop and surrounding the upper end of said internal housing, and having a bottom end contacting said nozzle; and, (g) a substantially flat gasket valve slidably engaging said cleaning wire, and disposed between the lower end of said internal housing and said valve-seating surface, said first and second coil springs being so proportioned that, (i) upon application of a downwardly directed valve actuating force on said center shaft effective to compress said first coil spring, thus moving the valve from open to closed positions, said gasket valve contacting said seating surface before said second coil spring compresses to the extent that there is substantial downward displacement of said cleaning wire, and (ii) upon release of said downwardly directing valve actuating force there will be a substantial upward displacement of said cleaning wire before said first coil spring releases to the extent that said second travel stop engages the upper end of said internal housing, thereby causing said gasket valve to disengage said seating surface.

5. The seed-planting valve of claim 4 further characterized in that the lowermost extremity of said nozzle is inwardly and concavely recessed to provide an inner edge of reduced diameter.

6. The seed-planting valve of claim 4 further characterized in that at least a portion of said cleaning wire is non-circular in cross-section.

7. The seed-planting valve of claim 6 further characterized in that the non-circular portion of said cleaning wire is substantially triangular in cross section.

8. The seed-planting valve of claim 4 further characterized in that a portion of said center shaft beneath said first travel stop and above said second coil spring is enlarged to provide a center shaft stabilizer within said hollow core, and said second coil spring abuts the lower end of said stabilizer.

9. The seed-planting valve of claim 4 further characterized in that said elongated housing is substantially cylindrical.

10. The seed-planting valve of claim 4 further characterized in that (1) said cleaning wire is substantially circular throughout its entire length and, (2) extends a finite distance beyond the lowermost end of said nozzle when the gasket valve is not in contact with said valve seating surface, (3) an external wire is connected to the outer surface of said nozzle, the wire extending downwardly substantially parallel to the cleaning wire and, terminating in a horizontal loop surrounding said cleaning wire.

* * * * *